United States Patent
Koizumi

[11] 4,139,266
[45] Feb. 13, 1979

[54] MEDIUM MAGNIFICATION OBJECTIVE FOR VIDEO DISKS

[75] Inventor: Toshimichi Koizumi, Sagamihara, Japan

[73] Assignee: Olympus Optical Co., Ltd., Tokyo, Japan

[21] Appl. No.: 763,082

[22] Filed: Jan. 27, 1977

[30] Foreign Application Priority Data
Jan. 30, 1976 [JP] Japan .................. 51-08344
Mar. 13, 1976 [JP] Japan .................. 51-14472

[51] Int. Cl.² .................. G02B 9/34; G02B 9/16
[52] U.S. Cl. .................. 350/220; 350/226
[58] Field of Search .................. 350/220, 226

[56] References Cited
U.S. PATENT DOCUMENTS
3,367,734  2/1968  Bystricky et al. .............. 350/220 X
FOREIGN PATENT DOCUMENTS
873703  7/1961  United Kingdom .................. 350/226

Primary Examiner—Paul A. Sacher
Attorney, Agent, or Firm—Cushman, Darby & Cushman

[57] ABSTRACT

A medium magnification objective for video disks comprising three or four single lenses for which the number of lenses constituting the objective is small, the working distance is large and flatness of image is high.

9 Claims, 30 Drawing Figures

FIG. 1
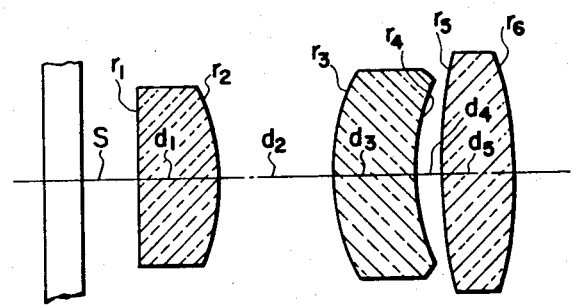
FIG. 2A
SPHERICAL ABERRATION
NA 0.4
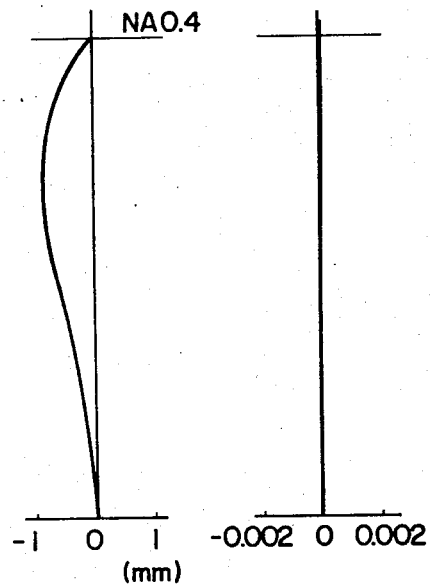
-1   0   1
(mm)
FIG. 2B
OSC'
-0.002  0  0.002
FIG. 2C
ASTIGMATISM
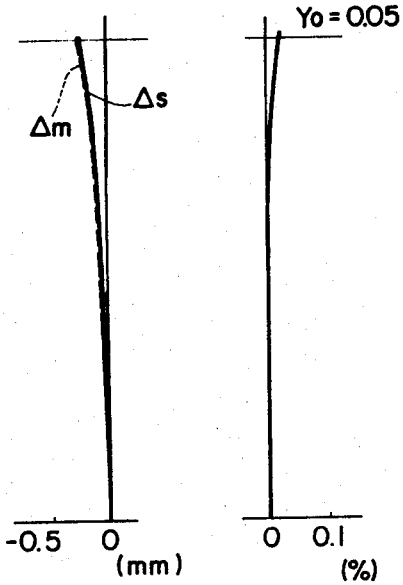
Δm   Δs
-0.5   0
(mm)
FIG. 2D
DISTORTION
Yo = 0.05
0   0.1
(%)

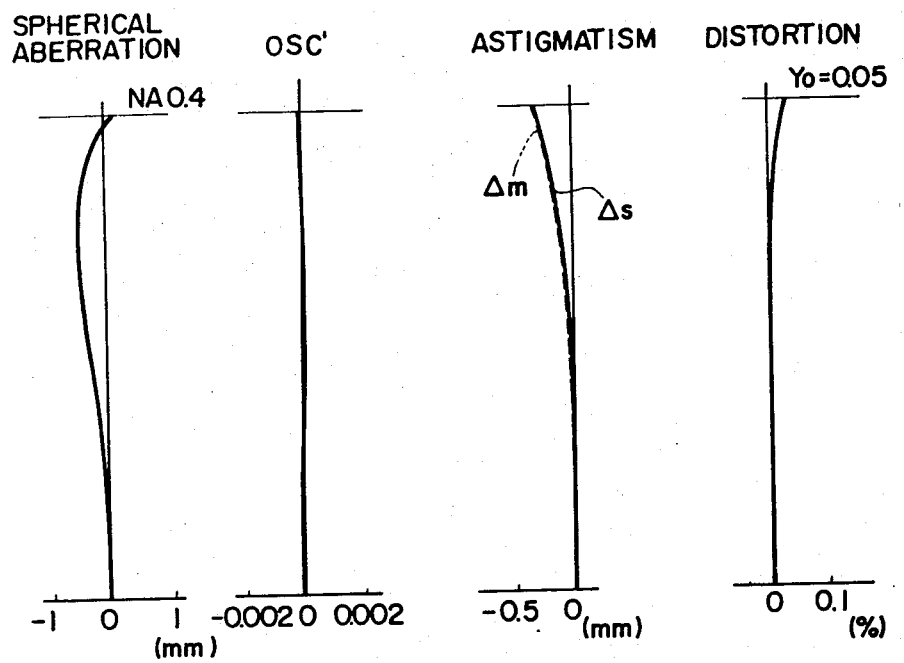
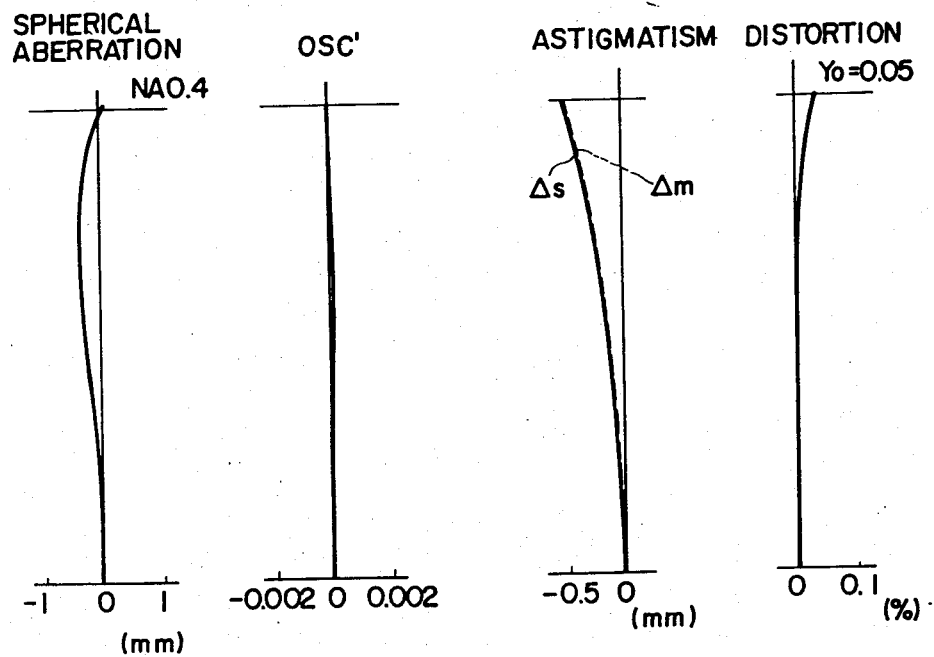

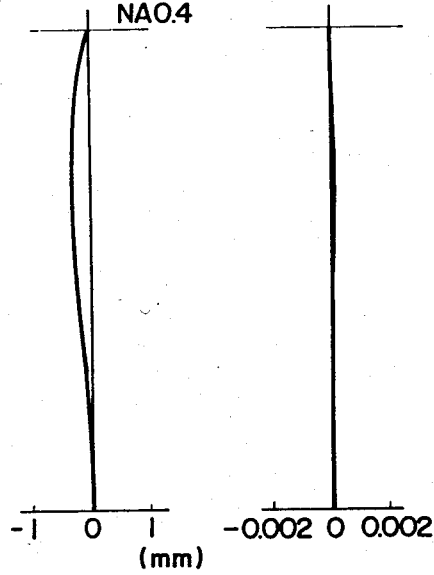
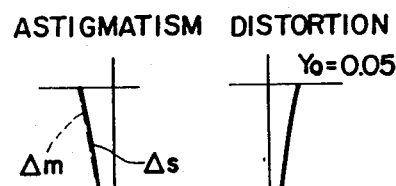
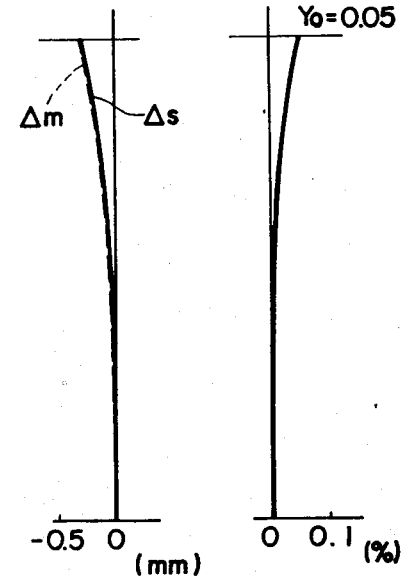
FIG. 5A SPHERICAL ABERRATION NA0.4
FIG. 5B OSC'
FIG. 5C ASTIGMATISM
FIG. 5D DISTORTION Y₀=0.05
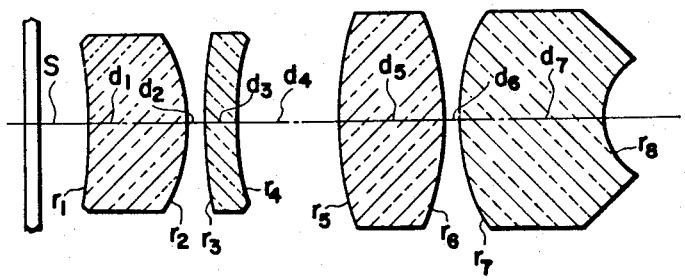
FIG. 6

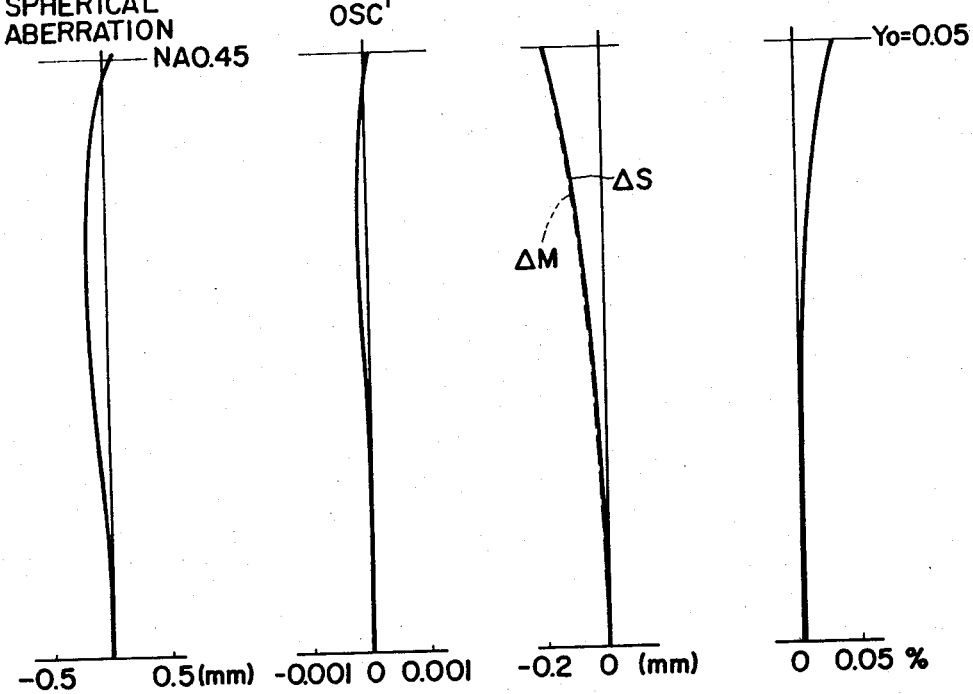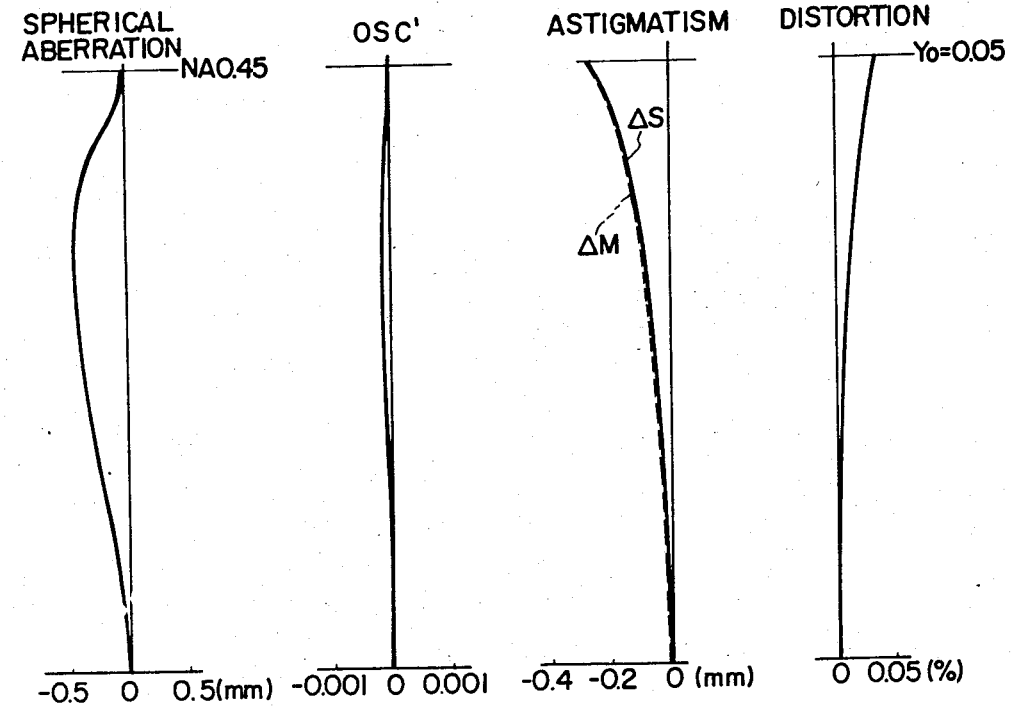

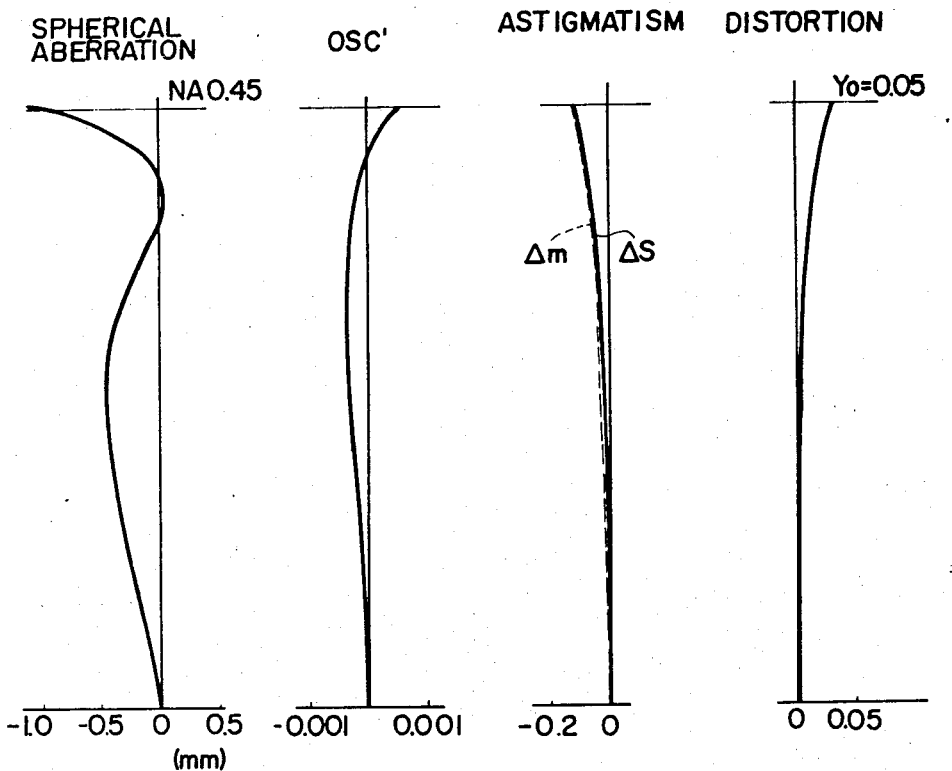

MEDIUM MAGNIFICATION OBJECTIVE FOR VIDEO DISKS

BACKGROUND OF THE INVENTION (a) Field of the Invention

The present invention relates to a medium magnification objective for video disks and, more particularly, to a medium magnification objective for reading out the signals recorded on high-density information-recording disks (video disks).

(b) Description of the Prior Art

For objectives to be used in reproducing systems for video disks, it is required to warrant resolving power of $1\mu$ due to the fact that the objective has to read out very small signals recorded with high density. Moreover, the information read out from the disk, which rotates at high speed, contains signals for making the objective follow up the recorded track and signals for automatic focusing in addition to image information. To make the objective read out those information and signals correctly, the flatness of image focused by the objective should be high. To prevent breakage of the video disk and objective which will be caused when the objective contacts the video disk, the working distance of the objective should be long. Besides, to perform automatic focusing, the objective should be compact and light in weight. Moreover, the price of the objective should be low.

As the light used for the objective for video disks is generally a monochromatic light ($\lambda$ = 632.8mm), it is effective for eliminating the noise at the time of amplifying the signals from a detector when transparency for the light of this wavelength is as high as possible. Therefore, to make transparency high, it is necessary to provide multi-layer anti-reflection coating on the lens surface or to make the number of lenses constituting the objective as small as possible. When this problem is considered in connection with the above-mentioned other requirements such as low price and light weight, it is more advantageous when the number of lenses constituting the objective is made as small as possible.

SUMMARY OF THE INVENTION

It is, therefore, a primary object of the present invention to provide a medium magnification objective for video disks for which the working distance is large, flatness of image is high and resolving power is high.

The objective for video disks according to the present invention comprises a first, second and third lenses as shown in FIG. 1. The first lens is a positive meniscus lens having comparatively large thickness with its planar or concave surface positioned toward the object, the second lens is a negative meniscus lens with its convex surface positioned toward the object, and the third lens is a biconvex lens. Besides, the objective for video disks according to the present invention satisfies the following conditions when reference symbol $r_2$ represents the radius of curvature of the surface on the image side of the first lens, reference symbol $r_3$ represents the radius of curvature of the surface on the object side of the second lens, reference symbol $d_1$ represents the thickness of the first lens, reference symbol $d_2$ represents the airspace between the first and second lenses, reference symbol $d_4$ represents the airspace between the second and third lenses, reference symbol $f_1$ represents the focal length of the first lens, reference symbol $f_{23}$ represents the total focal length of the second and third lenses, and reference symbol $f$ represents the focal length of the lens system as a whole.

(1) $2.5 \geq |r_2|/d_1 \geq 1.3$ (2) $2 \geq r_3/f \geq 1.1$ (3) $0.3 \geq d_4/d_2 \geq 0.13$ (4) $0.8 \geq d_2/f \geq 0.1$ (5) $2.3 \geq f_{23}/f_1 \geq 1.5$ In the objective for video disks according to the present invention having the above-mentioned configuration, the first and third lenses serve to converge the rays from the object and the second lens serves to make the flatness of image high and to make the working distance large by shifting the front focal point toward the object.

As for the condition (1) out of the above-mentioned respective conditions, spherical aberration will be somewhat undercorrected if $|r_2|/d_1$ bocomes $|r_2|/d_1$ >2.5. If it becomes $|r_2|/d_1$ <1.3, spherical aberration will be somewhat overcorrected in the marginal portion, coma will be aggravated and, at the same time, the working distance will become short.

If it becomes $r_3/f$ >2 in the condition (2), astigmatism will be aggravated. If, on the contrary, it becomes $r_3/f$ <1.1, the astigmatic difference will tend to become large.

If it becomes $d_4/d_2$ >0.3 in the condition (3), the astigmatic difference will become large and coma will be somewhat overcorrected. If it becomes $d_4/d_2$ <0.13, the astigmatic difference becomes small. However, coma of offaxial rays becomes asymmetrical in the marginal portion.

If it becomes $d_2/f$ >0.8 in the condition (4), the astigmatic difference will become small. However, coma of offaxial rays will be somewhat overcorrected in the marginal portion and will become assymmetrical. If it becomes $d_2/f$ <0.1, the astigmatic difference will become large.

If it becomes $f_{23}/f_1$ <1.5 in the condition (5), it becomes difficult to satisfactorily correct the coma, which is caused by the first lens, by the second and third lenses. Moreover, spherical aberration in the zonal portion will be considerably undercorrected and pin-cushion type distortion will be caused and will tend to become large. If it becomes $f_{23}/f_1$ >2.3, spherical aberration will be somewhat overcorrected in the marginal portion.

When refractive indices $n_1$, $n_2$ and $n_3$ of respective lenses are made $n_1 \geq 1.6$, $n_2 \geq 1.6$ and $n_3 \geq 1.6$ in addition to the above mentioned respective conditions, it is not necessary to make the radii of curvature of respective lens surfaces very small in the course of correction of aberrations and, therefore, it becomes easier to manufacture the lenses.

Besides, when the ratio $d_2/f$ is large, the back focal point, i.e., the exit pupil will be positioned within the lens system. When, on the other hand, the ratio $d_2/f$ is small, the exit pupil will be positioned outside the lens system. When, on the other hand, the ratio $d_2/f$ is small, the exit pupil will be positioned outside the lens system. When, therefore, the user requires that the exit pupil should be positioned near the final lens, the ratio $d_2/f$ becomes an important factor.

Now, FIG. 6 shows an objective for video disks arranged by improving the objective shown in FIG. 1 so that the numerical aperture becomes larger than that of the objective shown in FIG. 1, the flatness of image becomes still higher and the working distance becomes still larger. To make the numerical aperture larger, in the objective shown in FIG. 6, a negative meniscus lens having a large thickness is added on the image side of the lens system as the fourth lens by positioning its convex surface toward the object. The objective shown in FIG. 6 satisfies the following conditions when reference symbol f represents the focal length of the lens system as a whole, reference symbol $f_2$ represents the focal length of the second lens, reference symbols $d_3$ and $d_7$ respectively represent thicknesses of the second and fourth lenses, and reference symbol $r_8$ represents the radius of curvature of the surface on the image side of the fourth lens.

(6) $4.2 \geq |f_2|/f \geq 2.2$ (7) $0.31 \geq d_3/f \geq 0.1$ (8) $6 \geq d_7/d_3 \geq 1$ (9) $0.8 \geq r_8/f \geq 0.5$ The objective for video disks according to the present invention shown in FIG. 6 is arranged to make the numerical aperture large by adding the negative meniscus lens as the fourth lens as described in the above. Besides, the fourth lens serves in combination with the second lens to shift the front focal point toward the object so that the working distance becomes still larger and to make the flatness of image still higher.

Out of the above conditions (6) through (9), the condition (6) relates to the focal length $f_2$ of the second lens. If it becomes $4.2 < |f_2|/f$ in this condition, the flatness of image will be aggravated. Moreover, as the front focal point will be shifted toward the lens, the working distance tends to become small. Therefore, it becomes necessary to solve the above problems by the fourth lens. If, however, it is attempted to solve the above problems by the fourthe lens, the radius of curvature $r_8$ necessarily becomes small and it becomes difficult to manufacture the fourth lens. If, on the contrary, it becomes $2.2 < |f_2|/f$, the flatness of image may be improved. However, divergence of rays passed through the second lens becomes large. As a result, spherical aberration will be undercorrected in the marginal portion and it becomes impossible to correct it by the third and fourth lenses.

If it becomes $0.31 < d_3/f$ in the condition (7), spherical aberration and sine condition will be considerably undercorrected and it becomes very difficult to correct them favourably. Moreover, the front focal point will be shifted toward the lens and the working distance will become small. When, on the contrary, it becomes $0.1 > d_3/f$, spherical aberration and sine condition may be only slightly overcorrected and this is not unfavourable. However, the thickness of the second lens will become too small. As a result, it becomes difficult to manufacture the second lens and the cost of production becomes high.

If it becomes $6 < d_7/d_3$ in the condition (8), spherical aberration will be undercorrected and the astigmatic difference will become large. If it becomes $1 > d_7/d_3$, it becomes difficult to correct spherical aberration and coma favourably.

If it becomes $0.8 < r_8/f$ in the condition (9), the flatness of image will be aggravated and it becomes very difficult to correct it by the second lens. Moreover, spherical aberration will be undercorrected. If it becomes $0.5 > r_8/f$, the flatness of image will become favourable. However, spherical aberration will be overcorrected. Moreover, $r_8$ becomes small and consequently it becomes difficult to manufacture the fourth lens.

In the objective shown in FIG. 6, the airspace $d_4$ between the second and third lenses contributes to correction of astigmatism. To correct astigmatism favourably, it is more preferable to select the airspace $d_4$ within the range of $0.4 < d_4 < 0.64$. Besides, when refractive indices of respective lenses are higher, aberrations to be caused by respective lens surfaces become smaller and it is easier to correct them. Therefore, it is preferable to make refractive indices of respecitive lenses as $n\lambda > 1.6$. Especially, the fourth lens has the surface for correcting curvature of field and, therefore, the radius of curvature of that surface tends to become small. As a result, there is such tendency that coma is caused by that surface and, moreover, it will become somewhat difficult to manufacture the fourth lens. To solve these problems, it is also advantageous when the refractive index of the fourth lens is made high.

BRIEF DESCRIPTION OF THE DRAWINGS

FIG. 1 shows a sectional view of Embodiments 1 through 4 of the objective according to the present invention;

FIGS. 2A, 2B 2C and 2D respectively show graphs illustrating aberration curves of Embodiment 1;

FIGS. 3A, 3B, 3C and 3D respectively show graphs illustrating aberration curves of Embodiment 2;

FIGS. 4A, 4B, 4C and 4D respectively show graphs illustrating aberration curves of Embodiment 3;

FIGS. 5A, 5B, 5C and 5D respectively show graphs illustrating aberration curves of Embodiment 4;

FIG. 6 shows a sectional view of Embodiments 5 through 7 of the objective according to the present invention;

FIGS. 7A, 7B, 7C and 7D respectively show graphs illustrating aberration curves of Embodiment 5;

FIGS. 8A, 8B, 8C and 8D respectively show graphs illustrating aberration curves of Embodiment 6; and FIGS. 9A, 9B, 9C and 9D respectively show graphs illustrating aberration curves of Embodiment 7.

DETAILED DESCRIPTION OF THE PREFERRED EMBODIMENTS

Preferred embodiments of the medium magnification objective for video disks according to the present invention are as shown below.

| Embodiment 1 | | | |
|---|---|---|---|
| $r1 = \infty$ | | | |
| | $d1 = 0.415$ | $n1 = 1.77859$ | $\nu1 = 25.7$ |
| $r2 = 0.915$ | | | |
| | $d2 = 0.521$ | | |
| $r3 = 1.185$ | | | |
| | $d3 = 0.307$ | $n2 = 1.77859$ | $\nu2 = 25.7$ |
| $r4 = 0.961$ | | | |
| | $d4 = 0.143$ | | |
| $r5 = 3.330$ | | | |
| | $d5 = 0.314$ | $n3 = 1.77859$ | $\nu3 = 25.7$ |
| $r6 = -2.041$ | | | |
| | $f = 1.0,$ | $f1 = 1.18,$ | $f23 = 2.09$ |
| | $S = 0.307,$ | $N.A. = 0.4,$ | $\beta = -20 x$ |

Embodiment 2

| | | | |
|---|---|---|---|
| r1 = −12.859 | | | |
| | d1 = 0.349 | n1 = 1.77859 | ν1 = 25.7 |
| r2 = −0.813 | | | |
| | d2 = 0.575 | | |
| r3 = 1.320 | | | |
| | d3 = 0.350 | n2 = 1.77859 | ν2 = 25.7 |
| r4 = 1.045 | | | |
| | d4 = 0.129 | | |
| r5 = 3.452 | | | |
| | d5 = 0.352 | n3 = 1.77859 | ν3 = 25.7 |
| r6 = 1.806 | | | |
| | f = 1.0, | f1 = 1.10, | f23 = 1.98 |
| | S = 0.14, | N.A = 0.4, | β = −20 x |

Embodiment 3

| | | | |
|---|---|---|---|
| r1 = −2.847 | | | |
| | d1 = 0.25 | n1 = 1.77859 | ν1 = 25.7 |
| r2 = 0.591 | | | |
| | d2 = 0.759 | | |
| r3 = 1.391 | | | |
| | d3 = 3.03 | n2 = 1.77859 | ν2 = 25.7 |
| r4 = 1.140 | | | |
| | d4 = 0.126 | | |
| r5 = 5.253 | | | |
| | d5 = 0.385 | n3 = 1.77859 | ν3 = 25.7 |
| r6 = 1.695 | | | |
| | f = 1.0, | f1 = 0.91, | f23 = 2.05 |
| | S = 0.235, | N.A = 0.4, | β = −20 x |

Embodiment 4

| | | | |
|---|---|---|---|
| r1 = ∞ | | | |
| | d1 = 0.448 | n1 = 1.72309 | ν1 = 28.5 |
| r2 = −0.652 | | | |
| | d2 = 0.693 | | |
| r3 = 1.883 | | | |
| | d3 = 0.356 | n2 = 1.77861 | ν2 = 25.7 |
| r4 = 1.289 | | | |
| | d4 = 0.102 | | |
| r5 = 2.824 | | | |
| | d5 = 0.397 | n3 = 1.77861 | ν3 = 25.7 |
| r6 = −1.762 | | | |
| | f = 1.0, | f1 = 0.90, | f23 = 1.94 |
| | S = 0.144, | N.A = 0.4, | β = −20 x |

Embodiment 5

| | | | |
|---|---|---|---|
| r1 = −7.6008 | | | |
| | d1 = 0.9048 | n1 = 1.77861 | ν1 = 25.7 |
| r2 = −1.2050 | | | |
| | d2 = 0.0354 | | |
| r3 = 2.3387 | | | |
| | d3 = 0.2257 | n2 = 1.77861 | ν2 = 25.7 |
| r4 = 1.2799 | | | |
| | d4 = 0.5856 | | |
| r5 = 2.6429 | | | |
| | d5 = 0.6135 | n3 = 1.61655 | ν3 = 36.3 |
| r6 = −2.4851 | | | |
| | d6 = 0.0189 | | |
| r7 = 1.3231 | | | |
| | d7 = 1.0313 | n4 = 1.77861 | ν4 = 25.7 |
| r8 = 0.7271 | | | |
| | f = 1, | f2 = −4.002, | S = 0.528 |
| | N.A. = 0.45, | β = −20 x | |

Embodiment 6

| | | | |
|---|---|---|---|
| r1 = ∞ | | | |
| | d1 = 0.4154 | n1 = 1.77861 | ν1 = 25.7 |
| r2 = −0.9866 | | | |
| | d2 = 0.1901 | | |
| r3 = 2.0044 | | | |
| | d3 = 0.2740 | n2 = 1.77861 | ν2 = 25.7 |
| r4 = 0.9722 | | | |
| | d4 = 0.4522 | | |
| r5 = 3.0901 | | | |
| | d5 = 0.2776 | n3 = 1.77861 | ν3 = 25.7 |
| r6 = −1.4689 | | | |
| | d6 = 0.5103 | | |
| r7 = 0.9637 | | | |

-continued

Embodiment 6

| | | | |
|---|---|---|---|
| | d7 = 0.3789 | n4 = 1.77861 | ν4 = 25.7 |
| r8 = 0.7378 | | | |
| | f = 1, | f2 = −2.743, | S = 0.344 |
| | N.A = 0.45, | β = −20 x | |

Embodiment 7

| | | | |
|---|---|---|---|
| r1 = −9.2994 | | | |
| | d1 = 0.7012 | n1 = 1.77861 | ν1 = 25.7 |
| r2 = −1.2407 | | | |
| | d2 = 0.0501 | | |
| r3 = 2.1560 | | | |
| | d3 = 0.1140 | n2 = 1.77861 | ν2 = 25.7 |
| r4 = 1.0029 | | | |
| | d4 = 0.4989 | | |
| r5 = 4.2726 | | | |
| | d5 = 0.4967 | n3 = 1.77861 | ν3 = 25.7 |
| r6 = −1.4708 | | | |
| | d6 = 0.0873 | | |
| r7 = 0.9676 | | | |
| | d7 = 0.6206 | n4 = 1.77861 | ν4 = 25.7 |
| r8 = 0.6090 | | | |
| | f = 1, | f2 = −2.517, | S = 0.313 |
| | N.A = 0.45, | β = −20 x | |

In the above-mentioned respective embodiments, reference symbols $r_1, r_2, \ldots$ respectively represent radii of curvature of respective lens surfaces, reference symbols $d_1, d_2, \ldots$ respectively represent thicknesses of respective lenses and airspaces between respective lenses, reference symbols $n_1, n_2, \ldots$ respectively represent refractive indices of respective lenses at $\lambda = 632.8$nm, reference symbols $\nu_1, \nu_2, \ldots$ respectively represent Abbe's numbers of respective lenses for d-line and reference symbol S represents the distance from the object to the first lens surface of the lens system (working distance).

I claim:

1. A medium magnification objective for video disks comprising a first, second and third lenses, said first lens being a thick positive lens, said second lens being a negative meniscus lens with its convex surface positioned toward the object side, said third lens being a positive lens, said medium magnification objective for video disks satisfying the following conditions:

(1) $2.4 \geq |r_2|/d_1 \geq 1.4$ (2) $1.9 \geq r_3/f \geq 1.1$ (3) $0.3 \geq d_4/d_2 \geq 0.14$ (4) $0.8 \geq d_2/f \geq 0.5$ (5) $2.3 \geq f_{23}/f_1 \geq 1.7$ wherein reference symbol $r_2$ represents the radius of curvature of the surface on the image side of the first lens, reference symbol $r_3$ represents the radius of curvature of the surface on the object side of the second lens, reference symbol $d_1$ represents the thickness of the first lens, reference symbol $d_2$ represents the airspace between the first and second lenses, reference symbol $d_4$ represents the airspace between the second and third lenses, reference symbol $f_1$ represents the focal length of the first lens, reference symbol $f_{23}$ represents the total focal length of the second and third lenses, and reference symbol f represents the focal length of the lens system as a whole.

2. A medium magnification objective for video disks according to claim 1, in which said medium magnification objective for video disks has the following numerical data:

| | | | |
|---|---|---|---|
| r1 = ∞ | d1 = 0.415 | n1 = 1.77859 | ν1 = 25.7 |
| r2 = −0.915 | d2 = 0.521 | | |
| r3 = 1.185 | d3 = 0.307 | n2 = 1.77859 | ν2 = 25.7 |
| r4 = 0.961 | d4 = 0.143 | | |
| r5 = 3.330 | d5 = 0.314 | n3 = 1.77859 | ν3 = 25.7 |
| r6 = −2.041 | | | |
| f = 1.0, | f1 = 1.18, | f23 = 2.09 | |
| S = 0.307, | N.A = 0.4, | β = −20 x | | wherein reference symbols r1 through r6 respectively represent radii of curvature of respective lens surfaces, reference symbols d1 through d5 respectively represent thicknesses of respective lenses and airspaces between respective lenses, reference symbols n1, n2 and n3 respectively represent refractive indices of respective lenses at λ = 632.8nm, reference symbols ν1, ν2 and ν3 respectively represent Abbe's numbers of respective lenses, reference symbol f represents the focal length of the lens system as a whole, reference symbol f1 represents the focal length of the first lens, reference symbol f23 represents the total focal length of the second and third lenses, and reference symbol S represents the distance from the object to the first lens surface of the lens system.

3. A medium magnification objective for video disks according to claim 1, in which said medium magnification objective for video disks has the following numerical data:

| | | | |
|---|---|---|---|
| r1 = −12.859 | d1 = 0.349 | n1 = 1.77859 | ν1 = 25.7 |
| r2 = −0.813 | d2 = 0.575 | | |
| r3 = 1.320 | d3 = 0.350 | n2 = 1.77859 | ν2 = 25.7 |
| r4 = 1.045 | d4 = 0.129 | | |
| r5 = 3.452 | d5 = 0.352 | n3 = 1.77859 | ν3 = 25.7 |
| r6 = −1.806 | | | |
| f = 1.0, | f1 = 1.10, | f23 = 1.98 | |
| S = 0.14, | N.A = 0.4, | β = −20 x | | wherein reference symbols r1 through r6 respectively represent radii of curvature of respective lens surfaces, reference symbols d1 through d5 respectively represent thicknesses of respective lenses and airspaces between respective lenses, reference symbols n1, n2 and n3 respectively represent refractive indices of respective lenses at λ = 632.8nm, reference symbols ν1, ν2 and ν3 respectively represent Abbe's numbers of respective lenses, reference symbol f represents the focal length of the lens system as a whole, reference symbol f1 represents the focal length of the first lens, reference symbol f23 represents the total focal length of the second and third lenses, and reference symbol S represents the distance from the object to the first lens surface of the lens system.

4. A medium magnification objective for video disks according to claim 1, in which said medium magnification objective for video disks has the following numerical data:

| | | | |
|---|---|---|---|
| r1 = −2.847 | d1 = 0.25 | n1 = 1.77859 | ν1 = 25.7 |
| r2 = −0.591 | d2 = 0.759 | | |
| r3 = 1.391 | d3 = 3.03 | n2 = 1.77859 | ν2 = 25.7 |
| r4 = 1.140 | d4 = 0.126 | | |
| r5 = 5.253 | d5 = 0.385 | n3 = 1.77859 | ν3 = 25.7 |
| r6 = −1.695 | | | |
| f = 1.0, | f1 = 0.91, | f23 = 2.05 | |
| S = 0.235, | N.A = 0.4, | β = −20 x | | wherein reference symbols r1 through r6 respectively represent radii of curvature of respective lens surfaces, reference symbols d1 through d5 respectively represent thicknesses of respective lenses and airspaces between respective lenses, reference symbols n1, n2 and n3 respectively represent refractive indices of respective lenses at λ = 632.8nm, reference symbols ν1, ν2 and ν3 respectively represent Abbe's numbers of respective lenses, reference symbol f represents the focal length of the lens system as a whole, reference symbol f1 represents the focal length of the first lens, reference symbol f23 represents the total focal length of the second and third lenses, and reference symbol S represents the distance from the object to the first lens surface of the lens system.

5. A medium magnification objective for video disks according to claim 1, in which said medium magnification objective for video disks has the following numerical data:

| | | | |
|---|---|---|---|
| r1 = ∞ | d1 = 0.448 | n1 = 1.72309 | ν1 = 28.5 |
| r2 = −0.652 | d2 = 0.693 | | |
| r3 = 1.883 | d3 = 0.356 | n2 = 1.77861 | ν2 = 25.7 |
| r4 = 1.289 | d4 = 0.102 | | |
| r5 = 2.824 | d5 = 0.397 | n3 = 1.77861 | ν3 = 25.7 |
| r6 = −1.762 | | | |
| f = 1.0, | f1 = 0.90, | f23 = 1.94 | |
| S = 0.144, | N.A = 0.4, | β = −20 x | | wherein reference symbols r1 through r6 respectively represent radii of curvature of respective lens surfaces, reference symbols d1 through d5 respectively represent thicknesses of respective lenses and airspaces between respective lenses, reference symbols n1, n2 and n3 respectively represent refractive indices of respective lenses at λ = 632.8nm, reference symbols ν1, ν2 and ν3 respectively represent Abbe's numbers of respective lenses, reference symbol f represents the focal length of the lens system as a whole, reference symbol f1 represents the focal length of the first lens, reference symbol f23 represents the total focal length of the second and third lenses, and reference symbol S represents the distance from the object to the first lens surface of the lens system.

6. A medium magnification objective for video disks comprising a first, second, third and fourth lenses, said first lens being a thick positive lens, said second lens being a negative meniscus lens with its convex surface positioned toward the object side, said third lens being a positive lens, said fourth lens being a negative meniscus lens with its covex surface positioned toward the object side, said medium magnification objective for video disks satisfying the following conditions:

(6) $4.2 \geq |f_2|/f \geq 2.5$ (7) $0.28 \geq d_3/f \geq 0.1$ (8) $5.5 \geq d_7/d_3 \geq 1.3$ (9) $0.8 \geq r_8/f \geq 0.6$ wherein reference symbol $r_8$ represents the radius of curvature of the surface on the image side of the fourth lens, reference symbols $d_3$ and $d_7$ respectively represent thicknesses of the second and fourth lenses, reference symbol $f_2$ represents the focal length of the second lens, and reference symbol $f$ represents the focal length of the lens system as a whole.

7. A medium magnification objective for video disks according to claim 6, in which said medium magnification objective for video disks has the following numerical data:

| | | | |
|---|---|---|---|
| $r_1 = -7.6008$ | $d_1 = 0.9048$ | $n_1 = 1.77861$ | $\nu_1 = 25.7$ |
| $r_2 = 1.2050$ | $d_2 = 0.0354$ | | |
| $r_3 = 2.3387$ | $d_3 = 0.2257$ | $n_2 = 1.77861$ | $\nu_2 = 25.7$ |
| $r_4 = 1.2799$ | $d_4 = 0.5856$ | | |
| $r_5 = 2.6429$ | $d_5 = 0.6135$ | $n_3 = 1.61655$ | $\nu_3 = 36.3$ |
| $r_6 = -2.4851$ | $d_6 = 0.0189$ | | |
| $r_7 = 1.3231$ | $d_7 = 1.0313$ | $n_4 = 1.77861$ | $\nu_4 = 25.7$ |
| $r_8 = 0.7271$ | | | |
| $f = 1$, N.A $= 0.45$ | | $f_2 = -4.002$, $\beta = -20 x$ | $S = 0.528$ | wherein reference symbols $r_1$ through $r_8$ respectively represent radii of curvature of respective lens surfaces, reference symbols $d_1$ through $d_7$ respectively represent thicknesses of respective lenses and airspaces between respective lenses, reference symbols $n_1$ through $n_4$ respectively represent refractive indices of respective lenses at $\lambda = 632.8$nm, reference symbols $\nu_1$ through $\nu_4$ respectively represent Abbe's numbers of respective lenses, reference symbol $f$ represents the focal length of the lens system as a whole, reference symbol $f_2$ represents the focal length of the second lens, and reference symbol $S$ represents the distance from the object to the first lens surface of the lens system.

8. A medium magnification objective for video disks according to claim 6, in which said medium magnification objective for video disks has the following numerical data:

| | | | |
|---|---|---|---|
| $r_1 = \infty$ | $d_1 = 0.4154$ | $n_1 = 1.77861$ | $\nu_1 = 25.7$ |
| $r_2 = -0.9866$ | $d_2 = 0.1901$ | | |
| $r_3 = 2.0044$ | | | |
| $r_4 = 0.9722$ | $d_3 = 0.2740$ | $n_2 = 1.77861$ | $\nu_2 = 25.7$ |
| | $d_4 = 0.4522$ | | |
| $r_5 = 3.0901$ | $d_5 = 0.2776$ | $n_3 = 1.77861$ | $\nu_3 = 25.7$ |
| $r_6 = -1.4689$ | $d_6 = 0.5103$ | | |
| $r_7 = 0.9637$ | | | |
| $r_8 = 0.7378$ | $d_7 = 0.3789$ | $n_4 = 1.77861$ | $\nu_4 = 25.7$ |
| $f = 1$, N.A $= 0.45$ | | $f_2 = -2.743$, $\beta = -20 x$ | $S = 0.344$ | wherein reference symbols $r_1$ through $r_8$ respectively represent radii of curvature of respective lens surfaces, reference symbols $d_1$ through $d_7$ respectively represent thicknesses of respective lenses and airspaces between respective lenses, reference symbols $n_1$ through $n_4$ respectively represent refractive indices of respective lenses at $\lambda = 632.8$nm, reference symbols $\nu_1$ through $\nu_4$ respectively represent Abbe's numbers of respective lenses, reference symbol $f$ represents the focal length of the lens system as a whole, reference symbol $f_2$ represents the focal length of the second lens, and reference symbol $S$ represents the distance from the object to the first lens surface of the lens system.

9. A medium magnification objective for video disks according to claim 6, in which said medium magnification objective for video disks has the following numerical data:

| | | | |
|---|---|---|---|
| $r_1 = -9.2994$ | $d_1 = n_1 = 1.77861$ | | $\nu_1 = 25.7$ |
| $r_2 = -1.2407$ | $d_2 = 0.0501$ | | |
| $r_3 = 2.1560$ | $d_3 = 0.1140$ | $n_2 = 1.77861$ | $\nu_2 = 25.7$ |
| $r_4 = 1.0029$ | $d_4 = 0.4989$ | | |
| $r_5 = 4.2726$ | $d_5 = 0.4967$ | $n_3 = 1.77861$ | $\nu_3 = 25.7$ |
| $r_6 = -1.4708$ | $d_6 = 0.0873$ | | |
| $r_7 = 0.9676$ | $d_7 = 0.6206$ | $n_4 = 1.77861$ | $\nu_4 = 25.7$ |
| $r_8 = 0.6090$ | | | |
| $f = 1$, N.A $= 0.45$ | | $f_2 = -2.517$, $\beta = -20 x$ | $S = 0.313$ | wherein reference symbols $r_1$ through $r_8$ respectively represent radii of curvature of respective lens surfaces, reference symbols $d_1$ through $d_7$ respectively represent thicknesses of respective lenses and airspaces between respective lenses, reference symbols $n_1$ through $n_4$ respectively represent refractive indices of respective lenses at $\lambda = 632.8$nm, reference symbol $\nu_1$ through $\nu_4$ respectively represent Abbe's numbers of respective lenses, reference symbol $f$ represents the focal length of the lens system as a whole, reference symbol $f_2$ represents the focal length of the second lens, and reference symbol $S$ represents the distance from the object to the first lens surface of the lens system.

* * * * *

UNITED STATES PATENT AND TRADEMARK OFFICE
CERTIFICATE OF CORRECTION

PATENT NO. : 4,139,266

DATED : February 13, 1979

INVENTOR(S) : KOIZUMI, Toshimichi

It is certified that error appears in the above-identified patent and that said Letters Patent are hereby corrected as shown below:

In the heading:

Please correct:

[30] Foreign Application Priority Data

February 13, 1976    Japan........ 51-14472

Signed and Sealed this

Eleventh Day of September 1979

[SEAL]

*Attest:*

LUTRELLE F. PARKER

*Attesting Officer*    *Acting Commissioner of Patents and Trademarks*